US010159091B2

(12) United States Patent
Wang et al.

(10) Patent No.: US 10,159,091 B2
(45) Date of Patent: Dec. 18, 2018

(54) BASE STATION ASSISTANCE FOR RANDOM ACCESS PERFORMANCE IMPROVEMENT

(71) Applicant: InterDigital Patent Holdings, Inc., Wilmington, DE (US)

(72) Inventors: Lei Wang, San Diego, CA (US); Ronald G. Murias, Calgary (CA); Eldad M. Zeira, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/090,070

(22) Filed: Apr. 4, 2016

(65) Prior Publication Data
US 2016/0323913 A1 Nov. 3, 2016

Related U.S. Application Data

(63) Continuation of application No. 12/766,157, filed on Apr. 23, 2010, now abandoned.
(Continued)

(51) Int. Cl.
*H04W 4/00* (2018.01)
*H04W 74/00* (2009.01)
(Continued)

(52) U.S. Cl.
CPC ..... *H04W 74/006* (2013.01); *H04W 74/0833* (2013.01); *H04W 84/042* (2013.01); *H04W 88/02* (2013.01); *H04W 88/08* (2013.01)

(58) Field of Classification Search
USPC ........ 370/328–332, 334, 335–338, 341–348; 455/422–426.1, 436–442, 450, 452.2–453,
(Continued)

(56) References Cited

U.S. PATENT DOCUMENTS 6,519,449 B1 * 2/2003 Zhang ................ H04W 52/367
370/324
6,985,474 B2 1/2006 Dahlman et al.
(Continued)

FOREIGN PATENT DOCUMENTS

CN 101321371 A 12/2008
EP 1916793 8/2007
(Continued)

OTHER PUBLICATIONS

US 8,179,049, 05/2012, Kim et al. (withdrawn)
(Continued)

*Primary Examiner* — Thai D Hoang
(74) *Attorney, Agent, or Firm* — Volpe and Koenig, P.C.

(57) ABSTRACT

Methods and apparatus are described herein. According to a method, a wireless transmit/receive unit (WTRU) acquires a first random access configuration and a second random access configuration. The first random access configuration and the second random access configuration are different and each corresponds to different physical resources. The WTRU also performs a first random access procedure using the first random access configuration and a second random access procedure using the second random access configuration. The first random access configuration is used for at least initial random access and the second random access configuration is not used for initial random access and not used for handover random access.

16 Claims, 8 Drawing Sheets

Related U.S. Application Data (60) Provisional application No. 61/183,700, filed on Jun. 3, 2009, provisional application No. 61/172,072, filed on Apr. 23, 2009.

(51) Int. Cl.
*H04W 74/08* (2009.01)
*H04W 88/02* (2009.01)
*H04W 88/08* (2009.01)
*H04W 84/04* (2009.01)

(58) Field of Classification Search
USPC .......................................... 455/115.1–115.4
See application file for complete search history.

(56) References Cited

U.S. PATENT DOCUMENTS

| | | | | |
|---|---|---|---|---|
| 7,310,303 | B2* | 12/2007 | Koo | H04J 3/0682 370/206 |
| 7,804,799 | B2 | 9/2010 | Venkatachalam et al. | |
| 7,843,877 | B2 | 11/2010 | Lee et al. | |
| 8,027,368 | B2* | 9/2011 | Lee | H04B 7/2681 370/278 |
| 8,077,670 | B2* | 12/2011 | Fan | H04W 74/002 370/330 |
| 8,134,982 | B2* | 3/2012 | Lee | H04L 27/2655 370/335 |
| 8,170,049 | B2 | 5/2012 | Kim et al. | |
| 8,200,241 | B2 | 6/2012 | Du et al. | |
| 8,331,933 | B2 | 12/2012 | Koo et al. | |
| 2004/0185852 | A1* | 9/2004 | Son | H04W 36/12 455/438 |
| 2004/0185853 | A1* | 9/2004 | Kim | H04W 36/0083 455/438 |
| 2004/0219926 | A1* | 11/2004 | Kim | H04W 36/0088 455/452.2 |
| 2005/0030931 | A1* | 2/2005 | Sung | H04J 3/0682 370/342 |
| 2005/0053029 | A1 | 3/2005 | Lee et al. | |
| 2005/0058058 | A1* | 3/2005 | Cho | H04W 74/002 370/208 |
| 2005/0101326 | A1* | 5/2005 | Kang | H04W 36/0055 455/436 |
| 2005/0101328 | A1* | 5/2005 | Son | H04W 36/26 455/436 |
| 2005/0117539 | A1* | 6/2005 | Song | H04B 7/2621 370/328 |
| 2005/0197171 | A1* | 9/2005 | Son | H04W 52/28 455/574 |
| 2005/0201325 | A1* | 9/2005 | Kang | H04L 1/1614 370/328 |
| 2005/0266896 | A1* | 12/2005 | Son | H04B 1/1615 455/574 |
| 2006/0039320 | A1* | 2/2006 | Kang | H04W 52/0216 370/328 |
| 2006/0126570 | A1 | 6/2006 | Kim et al. | |
| 2006/0153131 | A1* | 7/2006 | Kang | H04L 27/2608 370/329 |
| 2006/0209734 | A1* | 9/2006 | Son | H04L 47/10 370/312 |
| 2006/0234742 | A1* | 10/2006 | Kim | H04W 60/04 455/513 |
| 2007/0032255 | A1* | 2/2007 | Koo | H04W 56/002 455/512 |
| 2007/0133460 | A1* | 6/2007 | Sohn | H04B 17/318 370/329 |
| 2007/0202882 | A1* | 8/2007 | Ju | H04W 72/0413 455/450 |
| 2007/0238464 | A1 | 10/2007 | Lim et al. | |
| 2008/0056193 | A1 | 3/2008 | Bourlas et al. | |
| 2009/0016316 | A1* | 1/2009 | Ogawa | H04W 56/0045 370/345 |
| 2009/0041240 | A1 | 2/2009 | Parkvall et al. | |
| 2009/0067404 | A1 | 3/2009 | Lee et al. | |
| 2009/0088164 | A1* | 4/2009 | Shen | H04B 7/155 455/436 |
| 2009/0191875 | A1* | 7/2009 | Vujcic | H04W 74/004 455/436 |
| 2009/0252028 | A1* | 10/2009 | Hwang | H04W 72/02 370/210 |
| 2009/0298504 | A1* | 12/2009 | Lee | H04W 36/0011 455/437 |
| 2009/0315779 | A1 | 12/2009 | Chin et al. | |
| 2010/0027462 | A1* | 2/2010 | Lee | H04B 7/2681 370/328 |
| 2010/0178933 | A1* | 7/2010 | Du | H04W 74/08 455/456.1 |
| 2010/0226324 | A1* | 9/2010 | Lee | H04W 48/08 370/329 |
| 2010/0232364 | A1* | 9/2010 | Hsu | H04W 74/085 370/328 |
| 2010/0260136 | A1* | 10/2010 | Fan | H04W 74/002 370/330 |
| 2011/0268081 | A1 | 11/2011 | Bourlas et al. | |
| 2012/0002617 | A1* | 1/2012 | Vujcic | H04W 74/002 370/329 |

FOREIGN PATENT DOCUMENTS

| | | |
|---|---|---|
| GB | 2466161 | 6/2011 |
| JP | 2009-017139 | 1/2009 |
| JP | 2009-071585 | 4/2009 |
| JP | 2009-081685 | 4/2009 |
| JP | 2009-081685 A2 | 4/2009 |
| WO | 08/004800 | 1/2008 |
| WO | 09/008633 | 1/2009 |
| WO | 2010077004 A2 | 7/2010 |

OTHER PUBLICATIONS

LAN/MAN Standards Committee of the IEEE Computer Society and the IEEE Microwave Theory and Techniques Society, "Draft Amendment to the IEEE Standard for Local and metropolitan area networks; Part 16: Air Interface for Fixed and Mobile Broadband Wireless Access Systems," IEEE P802.16m/D5 (Apr. 2010).

Third Generation Partnership Project, "Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 8)," 3GPP TS 36.523-1 V8.1.0 (Mar. 2009).

Third Generation Partnership Project, "Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 8)," 3GPP TS 36.523-1 V8.0.1 (Dec. 2008).

Third Generation Partnership Project, "Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 8)," 3GPP TS 36.523-1 V8.5.0 (Mar. 2010).

Third Generation Partnership Project, "Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 9)," 3GPP TS 36.523-1 V9.0.0 (Mar. 2010).

Advanced Air Interface (Working Document), "Part 16: Air Interface for Fixed and Mobile Broadband Wireless Access Systems", 802.16m 09/0010r1a (working document), (Mar. 2008).

IEEE Computer Society and the IEEE Microwave Theory and Techniques Society, "Part 16: Air Interface for Fixed Broadband Wireless Access Systems", IEEE Std 802.16 (2004).

IEEE Computer Society and the IEEE Microwave Theory and Techniques Society, "Part 16: Air Interface for Fixed and Mobile Broadband Wireless Access Systems, Amendment 2: Physical and Medium Access Control Layers for Combined Fixed and Mobile (56) References Cited

OTHER PUBLICATIONS

Operation in Licensed Bands and Corrigendum 1", IEEE 802.16e (2005) and IEEE Std 802.16 (2004/Cor1-2005) (Amendment and Corrigendum to IEEE Std 802.16-2004).
LAN/MAN Standards Committee of the IEEE Computer Society and the IEEE Microwave Theory and Techniques Society, "DRAFT Amendment to the IEEE Standard for Local and metropolitan area networks; Part 16: Air Interface for Fixed and Mobile Broadband Wireless Access Systems," IEEE P802.16m/D4 (Feb. 2010).
Nokia Siemens Networks, Nokia, "Dual-Cell HSUPA", TSG-RAN Meeting #43, RP-090014, (Biarritz, France, Mar. 3-6, 2009).
Orfanos et al., "A Centralized MAC Protocol with QoS Support for Wireless LANs," IEEE International Symposium on Personal, Indoor and Mobile Radio Communications, pp. 1-5 (Sep. 2007).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.5.0 (Mar. 2009).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.8.0 (Dec. 2009).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 v9.2.0 (Mar. 2010).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.5.0 (Mar. 2009).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.9.0 (Mar. 2010).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 v9.2.0 (Mar. 2010).
Third Generation Partnership Project, "Technical Specification Group Radio Access Network; Physical Layer Procedures (FDD) (Release 7)," 3GPP TS 25.214 V1.15.0, (Mar. 2010).
Third Generation Partnership Project, "Technical Specification Group Radio Access Network; Physical Layer Procedures (FDD) (Release 8)," 3GPP TS 25.214 v8.5.0, (Mar. 2009).
Third Generation Partnership Project, "Technical Specification Group Radio Access Network; Physical Layer Procedures (FDD) (Release 8)," 3GPP TS 25.214 v8.9.0, (Mar. 2010).
Third Generation Partnership Project, "Technical Specification Group Radio Access Network; Physical Layer Procedures (FDD) (Release 9" 3GPP TS 25.214 v9.0.0, (Sep. 2009).
Third Generation Partnership Project, "Technical Specification Group Radio Access Network; Physical Layer Procedures (FDD) (Release 9)," 3GPP TS 25.214 v9.2.0, (Mar. 2010).
Third Generation Partnership Project, Technical Specification Group Radio Access Network; Evolved Universal Terrestrial Radio Access (E-UTRA); Physical layer procedures (Release 8), 3GPP TS 36.213 V8.6.0 (Mar. 2009).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.1.0 (Mar. 2010).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.7.0 (May 2009).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
CATT, "Allocation of SPS C-RNTI," 3GPP TSG RAN WG2 #63, R2-084263 (Aug. 18-22, 2008).
CATT, "RA-RNTI design," 3GPP TSG RAN WG2 #6Ibis, R2-081673 (Mar. 31-Apr. 4, 2008).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.8.0 (Mar. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.2.0 (Dec. 2009).

\* cited by examiner

BASE STATION ASSISTANCE FOR RANDOM ACCESS PERFORMANCE IMPROVEMENT

CROSS REFERENCE TO RELATED APPLICATIONS

This application is a continuation of U.S. patent application Ser. No. 12/766,157, filed on Apr. 23, 2010, which claims the benefit of U.S. Provisional Application No. 61/172,072, which was filed on Apr. 23, 2009, and U.S. Provisional Application No. 61/183,700, which was filed on Jun. 3, 2009, the contents of which are hereby incorporated by reference herein.

FIELD OF INVENTION

This application is related to wireless communications.

BACKGROUND

Two issues that currently exist in wireless broadband systems are latency of random access (RA) failure detection on the subscriber side and collisions. An RA attempt fails when the BS fails to receive the RA signal correctly either due to collision, i.e., two or more users (subscribers) use the same RA opportunity, or due to an insufficient signal level.

The first issue is the latency issue of RA failure detection on the subscriber side. In scheduling-based access systems, RA accommodates new access needs, e.g., new users, existing users' new requirements, etc. Broadband Wireless Access systems, e.g., worldwide interoperablility for microwave access (WiMAX), and long term evolution (LTE), are typical scheduling-based access systems, where a base station (BS) controls the use of the air link resources.

When a RA failure occurs, the subscriber needs to detect it and then take actions accordingly, e.g., retry, or ramp up its transmission power. A commonly-used mechanism for a subscriber to detect the failure of its random access attempt is timer-based, i.e., after waiting a pre-defined time period without getting the expected response, the subscriber assumes that its previous RA attempt failed, where the expected response depends on the purpose of the RA.

The pre-defined time period may play a role in a timer-based RA failure detection mechanism because the recovery from a RA failure has to wait for the pre-defined time that needs to be sufficiently long enough to process the RA request receptions and responses under the worst-case considerations, e.g., the heaviest traffic loading.

The second issue relates to collision scenarios. A collision occurs when two or more subscribers choose the same RA opportunity, where a RA opportunity refers to the opportunity for a subscriber to send a RA request. For example, a RA opportunity in IEEE 802.16 systems consists of a RA channel and a RA code sent on the RA channel. When a collision occurs, there are several possible results. The first result is that the BS detects nothing. The second result is that the BS detects a collision. The third result is that a single RA Request is erroneously detected by the BS in the RA opportunity with collision.

SUMMARY

Methods and apparatus are described herein. According to a method, a wireless transmit/receive unit (WTRU) acquires a first random access configuration and a second random access configuration. The first random access configuration and the second random access configuration are different and each corresponds to different physical resources. The WTRU also performs a first random access procedure using the first random access configuration and a second random access procedure using the second random access configuration. The first random access configuration is used for at least initial random access and the second random access configuration is not used for initial random access and not used for handover random access.

BRIEF DESCRIPTION OF THE DRAWINGS

A more detailed understanding may be had from the following description, given by way of example in conjunction with the accompanying drawings wherein.

DETAILED DESCRIPTION

1. Introduction

When referred to hereafter, the terminology "wireless transmit/receive unit (WTRU)" includes but is not limited to a user equipment (UE), a mobile station (MS), a fixed or mobile subscriber station (SS or MS), an advanced mobile station (AMS), a pager, a cellular telephone, a personal digital assistant (PDA), a computer, or any other type of user device capable of operating in a wireless environment. When referred to hereafter, the terminology "base station (BS)" includes but is not limited to a BS, a site controller, an access point (AP), an advanced base station (ABS), a Node-B, or any other type of interfacing device capable of operating in a wireless environment. The solutions and mechanisms described herein may be applicable to TDD, FDD, and other systems.

Figure 1:
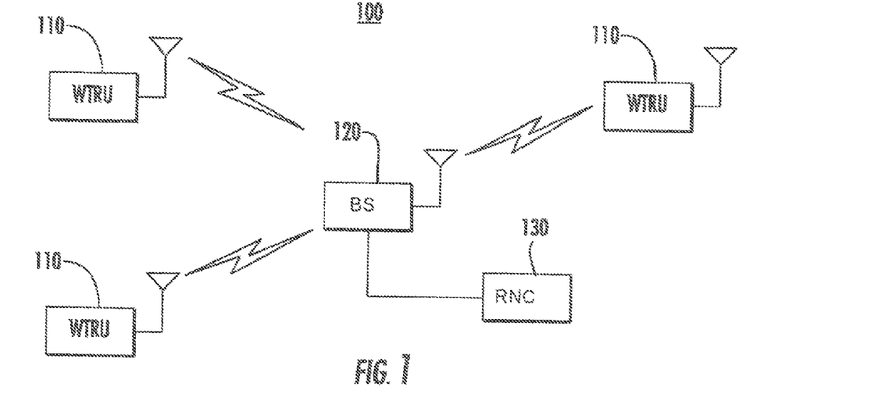
FIG. 1 shows an example wireless communication system including a plurality of WTRUs, a BS, and an RNC.

FIG. 1 shows a wireless communication system 100 including a plurality of WTRUs 110, a BS 120, and a radio network controller (RNC) 130. As shown in FIG. 1, the WTRUs 110 are in communication with the BS 120, which is in communication with the RNC 130. The WTRUs 110 are configured to receive data transmissions from the BS 120 over a high speed shared data channel. The BS 120 and/or WTRUs 110 are configured to detect random access (RA) failures and collisions, as described herein. Although only three WTRUs 110, one BS 120, and one RNC 130 are shown in FIG. 1, it should be noted that any combination of wireless and wired devices may be included in the wireless communication system 100. For example, although the RNC 130 is shown in the wireless communication system 100, the RNC 130 may not exist in the system 100 and may be included in the BS 120 or any other entity in the system 100. It should be understood that the communication between the WTRUs 110, BSes 120, and RNC 130 or other networks like the Internet may be done using packet-based communication.

Figure 2:
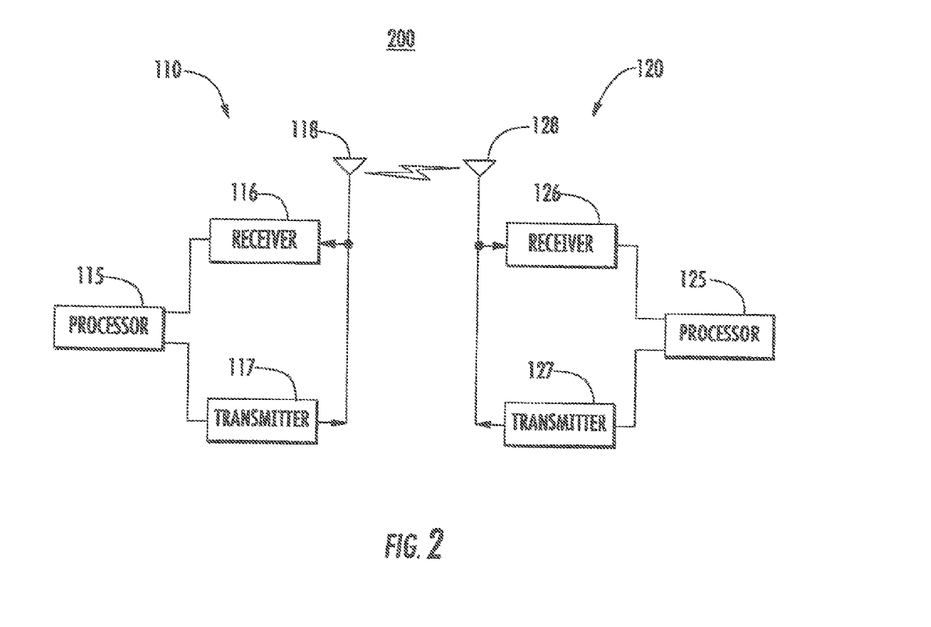
FIG. 2 is a functional block diagram of a wireless transmit/receive unit (WTRU) and the BS of FIG. 1.

FIG. 2 is a functional block diagram 200 of a WTRU 110 and the BS 120 of FIG. 1. As shown in FIG. 2, the WTRU 110 is in communication with the BS 120 and both may be configured to detect random access (RA) failures and collisions, as discussed below.

In addition to the components that may be found in a typical WTRU, the WTRU 110 includes a processor 115, a receiver 116, a transmitter 117, and an antenna 118. The processor 115 is configured to detect RA failures and collisions. The receiver 116 and the transmitter 117 are in communication with the processor 115. The antenna 118 is in communication with both the receiver 116 and the transmitter 117 to facilitate the transmission and reception of wireless data.

In addition to the components that may be found in a typical BS, the BS 120 includes a processor 125, a receiver 126, a transmitter 127, and an antenna 128. The processor 125 is configured to detect RA failures and collisions. The receiver 126 and the transmitter 127 are in communication with the processor 125. The antenna 128 is in communication with both the receiver 126 and the transmitter 127 to facilitate the transmission and reception of wireless data.

2. Example Frame Structure

Figure 3:
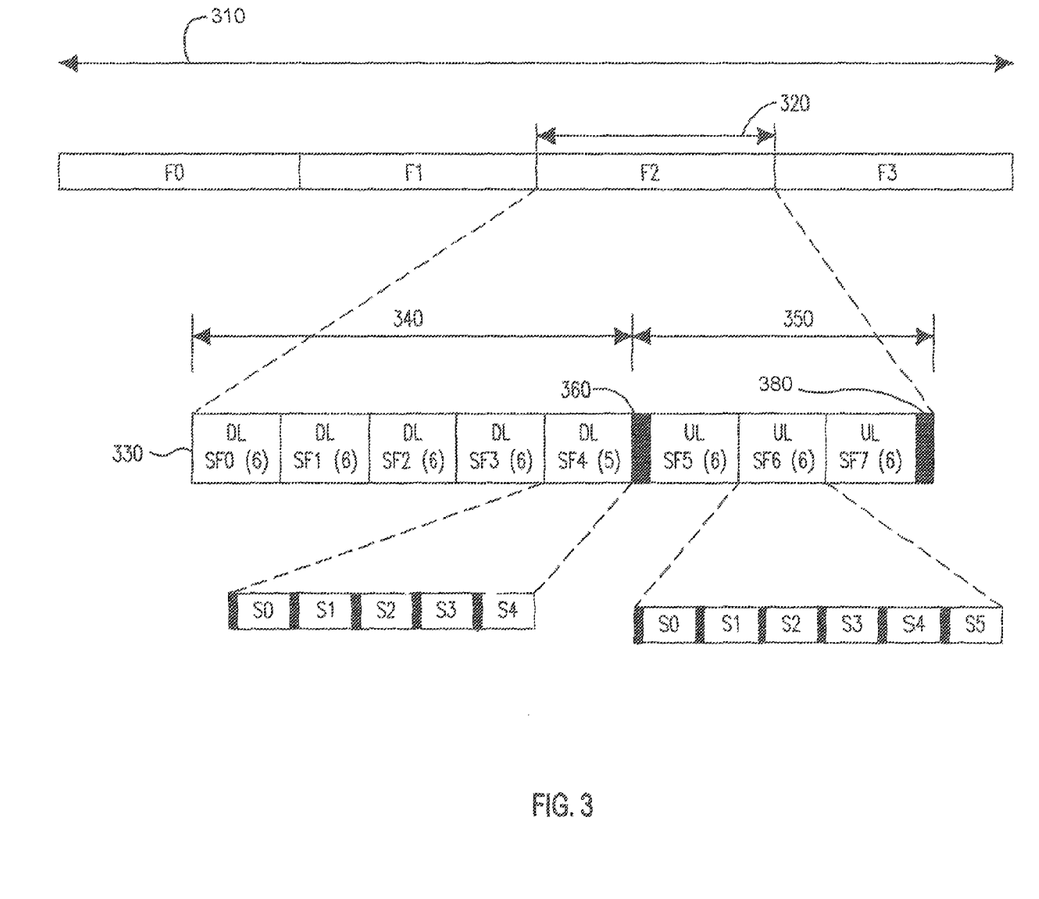
FIG. 3 shows a sample TDD frame structure.

FIG. 3 shows an example of a TDD frame structure that currently corresponds to the IEEE 802.16m TDD frame structure, although other frame structures can of course be used with the embodiments described herein. Regardless of channel bandwidth (5, 7, 8.75, 10, or 20 MHz), the superframe 310 may be 20 ms in length as shown and may be divided into four 5 ms frames 320. The frames 320 may be further divided into 5-8 subframes 330. These subframes 330 may each contain five, six, seven, or nine OFDM symbols, depending on the type of subframe 330 in use.

Each TDD subframe 330 contains a downlink portion 340 and an uplink portion 350, separated by a TTG (Transmit/Receive transition gap) 360 and an RTG (Receive/Transmit transition gap) 380, inserted between transmit and receive, or receive and transmit, respectively. Downlink/Uplink ratios may vary for the 5, 7, 8.75, 10, and 20 MHz bandwidths. Some examples of Downlink/Uplink ratios are: 8/0, 6/2, 5/3, 4/4, 3/5.

FIG. 3 shows the frame structure for 5, 10, and 20 MHz TDD with 5/3 DL/UL split.

A single downlink portion 340 may contain multiple bursts of varying size and type carrying data for several WTRUs. The size could also be variable on a frame-by-frame basis. Each burst may contain multiple concatenated fixed-size or variable-size packets or fragments of packets received from higher layers.

The uplink portion 350 may be made up of several uplink data bursts from different WTRUs. A portion of the uplink portion 350 may be set aside for contention-based access, also called Random Access (RA), that may be used for a variety of purposes, including ranging for UL, time, and power adjustments during network entry as well as periodically afterward. The RA channel may also be used by WTRUs to make uplink bandwidth requests. In addition, best-effort data may be sent on this contention-based channel, particularly when the amount of data to send is too small to justify requesting a dedicated channel.

3. Random Access (RA)

In scheduling based wireless broadband access systems, Random Access (RA) refers to an uplink (UL) region that is allocated for WTRUs to access. It is also referred to as contention-based access. The UL region allocated for RA may be called a Random Access (RA) region.

A RA region commonly includes RA channels, where a RA channel is physically modulated to carry certain information codes. The information code carried by a RA channel is called a RA code. In some RA code designs, multiple codes with certain orthogonal properties can be transmitted by different WTRUs in the same RA channel. For example, in IEEE 802.16 systems, a Code Division Multiple Access (CDMA)-like RA code may be used, so that one RA channel may be accessed by multiple WTRUs with different RA codes.

A RA opportunity may refer to the opportunity that a WTRU uses to transmit its RA request. When a RA channel may carry multiple RA codes, a RA opportunity may be a combination of a RA channel and a RA code. When a WTRU needs to send a RA request, it may transmit a specific RA code in a RA channel.

After sending a RA request, the WTRU waits for the BS to provide a response to its RA request that is identified by the RA opportunity that the WTRU used to send the RA request, e.g., the location of the RA region, RA channel, and RA code. The expected response varies with the intention of the WTRU's RA request.

3.1 RA Use Cases

The RA opportunities for different RA use cases may be identified by different RA regions allocated by the BS or by different RA code domains/different RA channels in the same RA region. At least four use cases of Random Access (RA) may exist: initial access for a new subscriber (WTRU) to join the network (initial ranging); Handover of a subscriber (WTRU) from one BS to another BS (HO ranging); periodic maintenance of the uplink (UL) transmission parameters (periodic ranging); and bandwidth requests for existing subscribers (WTRUs) (contention-based bandwidth request).

Initial ranging is a process for a new WTRU to initiate communication with a BS. The WTRU sends an initial ranging request in an initial ranging RA opportunity to the BS, for example, an initial ranging code in an Initial Ranging RA channel. After sending its initial ranging request, the WTRU waits for a response from the BS. The expected response to an initial ranging request may be a ranging status notification with or without UL transmission parameter adjustments.

HO ranging is a process for a WTRU to initiate communication with the target BS during handover from one BS to another BS. The WTRU sends a HO ranging request in a HO ranging RA opportunity to the BS, i.e., a HO ranging code in a HO ranging RA channel. After sending its HO Ranging request, the WTRU waits for a response from the BS. The expected response to a HO ranging request may be a ranging status notification with or without UL transmission parameter adjustments.

With respect to periodic ranging, since each WTRU may be a different distance from a BS, it may be important in the uplink to synchronize symbols in both the time domain and frequency domain and equalize the received power levels among the various active WTRUs. In the uplink, the active WTRUs may need to be synchronized to at least within a cyclic prefix guard time of one another. Otherwise, significant intercarrier and intersymbol interference may result. Similarly, although downlink power control may be used in order to reduce spurious other-cell interference, it may not be strictly required. Uplink power control may (1) improve battery life, (2) reduce spurious other-cell interference, and (3) avoid drowning out faraway WTRUs in the same cell that are sharing an Orthogonal Frequency Division Multiplexing (OFDM) symbol with them.

This periodic ranging process, when initiated, may require the BS to estimate the channel strength and the time/frequency of the received UL signals from the WTRU in question and then send the necessary UL transmission parameter adjustments, e.g., time, frequency, and/or power level, to the WTRU. When the WTRU uses unicast UL allocation, the BS may estimate the received unicast UL data from the WTRU to determine if UL transmission parameter adjustment is needed. When the WTRU does not have unicast UL allocation and the periodic ranging is initiated, the WTRU needs to use a periodic ranging RA opportunity to send the BS a periodic ranging request. After sending its periodic ranging request, the WTRU waits for a response from the BS. The expected response to the periodic ranging request may be a ranging status notification with or without UL transmission parameter adjustments.

A contention-based bandwidth request may be a process that a WTRU uses to request UL bandwidth by sending a Bandwidth Request (BR) RA request. The WTRU may send a BR RA request in a BR RA opportunity to the BS, i.e., a BR RA code in a BR RA channel. After sending a BR RA request, the WTRU waits for a response from the BS. The expected response to a BR RA request may be an UL bandwidth grant.

4. Embodiments Addressing Latentcy and Collisions

4.1 Latency

Within this or other systems, there are several embodiments that may address the latency issue of RA failure detection at the WTRU. Generally, the embodiments may use BS assistance to help the WTRUs in the RA-failure detection so that the WTRUs may timely and accurately detect the failures of their RA attempts and then start their RA recovery processes accordingly.

In a first embodiment, the BS may send responses to all the received RA requests in a RA region in the same aggregate BS RA response message, and this aggregate BS RA response may be sent at the earliest possible BS RA response opportunity. Depending on the purpose of the RA request, the BS RA responses may be ranging status notifications with or without parameter adjustments, resource allocations, or simple acknowledgements indicating a successful reception of the RA request.

In the event that no RA request is successfully received by the BS in a RA region, the BS may not transmit the response message or the BS may transmit a null message.

Upon receiving and decoding a BS RA response message that contains responses to the successfully received WTRU RA requests, a WTRU may deterministically detect if its own RA request was successfully received at the BS. The WTRU does this by checking whether the aggregate BS RA response message contains a response to its RA request, for example, a RA channel plus a RA code in IEEE 802.16 systems. If the aggregate BS RA response message does not contain any response to its RA request, the WTRU may consider that its RA request failed and then start its RA recovery process. This recovery process could begin immediately, without waiting for a time out, such that the latency of RA failure detection at WTRU side is significantly reduced.

Another benefit of using an aggregate BS RA message may be overhead reduction as the BS sends the responses to all the received RA requests in the same aggregate BS RA response message, compared to sending an individual TA response message to each RA request. The overhead reduction comes from saving multiple message headers and having a more efficient way to identify the RA opportunities in one aggregate message rather than identifying them each individually in separate messages.

4.1.1 Initial Ranging Request

For example, the BS may allocate a ranging RA region in the UL in order to provide initial ranging opportunities for the new WTRUs to join the network. A new WTRU, after acquiring the essential system configuration parameters and synchronizing with the downlink (DL) of the BS, may start the initial ranging process by sending an initial ranging request, i.e., transmitting a selected initial ranging RA code in a selected initial ranging channel. After receiving and decoding an initial ranging region, the BS may send an aggregate RA response message at the earliest possible BS initial ranging RA response opportunity. The aggregate RA response message may contain initial ranging RA responses to all the successfully received and decoded initial ranging RA requests in the initial ranging RA region. For each successfully received and decoded initial ranging request, the BS's RA response may contain the ranging status and the necessary UL transmission parameter adjustments.

Figure 4:
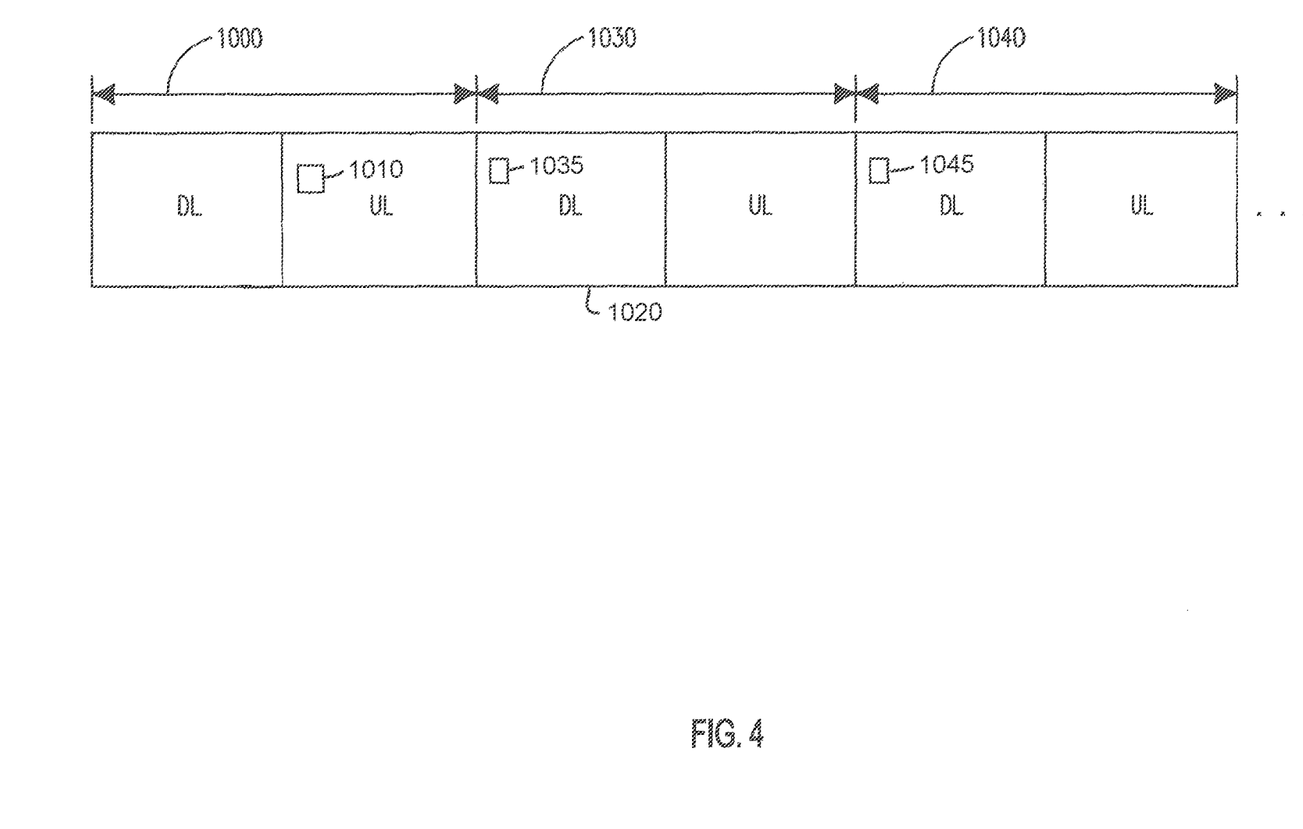
FIG. 4 shows an example ranging RA region and a BS's ranging RA response.

As shown in FIG. 4, after an UL initial ranging region 1010, the earliest BS initial ranging RA response opportunity may be determined by the BS's scheduler that manages and allocates the radio link resources based on the BS's real-time traffic load and traffic composition. For an initial ranging region in frame 1000, the earliest BS initial ranging RA response opportunity 1035 may be a DL portion 1020 of frame 1030, i.e., the next DL portion after the UL portion with the initial ranging region 1010, if the BS scheduler can accommodate the initial ranging RA aggregate response message in it after other higher priority traffic data. Otherwise, the earliest BS initial ranging RA response opportunity may be the RA response opportunity 1045 in the DL portion of frame 1040 or later. This may be due to heavy DL traffic with higher priorities.

After sending an initial ranging RA request, the WTRU waits for the initial ranging RA response from the BS. Once the initial ranging RA response message is received and decoded, the WTRU attempts to identify the response to its request based on the used initial ranging RA channel and initial ranging RA code. If the BS aggregate initial ranging RA response message contains a response to the WTRU's request, the WTRU may consider its initial ranging RA request successful and move to the next step according the given response. If the BS initial ranging RA aggregate response message does not contain a response to the WTRU's request, the WTRU may consider its initial ranging RA request failed, and it can immediately start the initial ranging RA recovery process.

The use of a BS initial ranging RA response message containing the responses to all successfully received and decoded initial ranging RA requests in an initial ranging region may make it possible for the WTRUs to timely and deterministically detect the status of their initial ranging RA attempts. If a WTRU detects a failure of its initial ranging RA request, the initial ranging RA recovery process may be started immediately, minimizing the latency in the initial ranging RA failure detection and recovery.

Comparing this to a method where the BS sends separate initial ranging responses to each successfully received and decoded initial ranging RA request, the aggregation of the responses to the successfully received and decoded initial ranging RA requests in one BS initial ranging RA response message reduces the overhead of MAC encodings, as it saves multiple MAC headers, and, also, it may have a more efficient way to identify the RA requests when aggregating them together.

An initial ranging RA timer may still be used to handle the exceptions, such as message delivery errors, in order to improve overall system robustness.

4.1.2 HO Ranging Request

Figure 5:
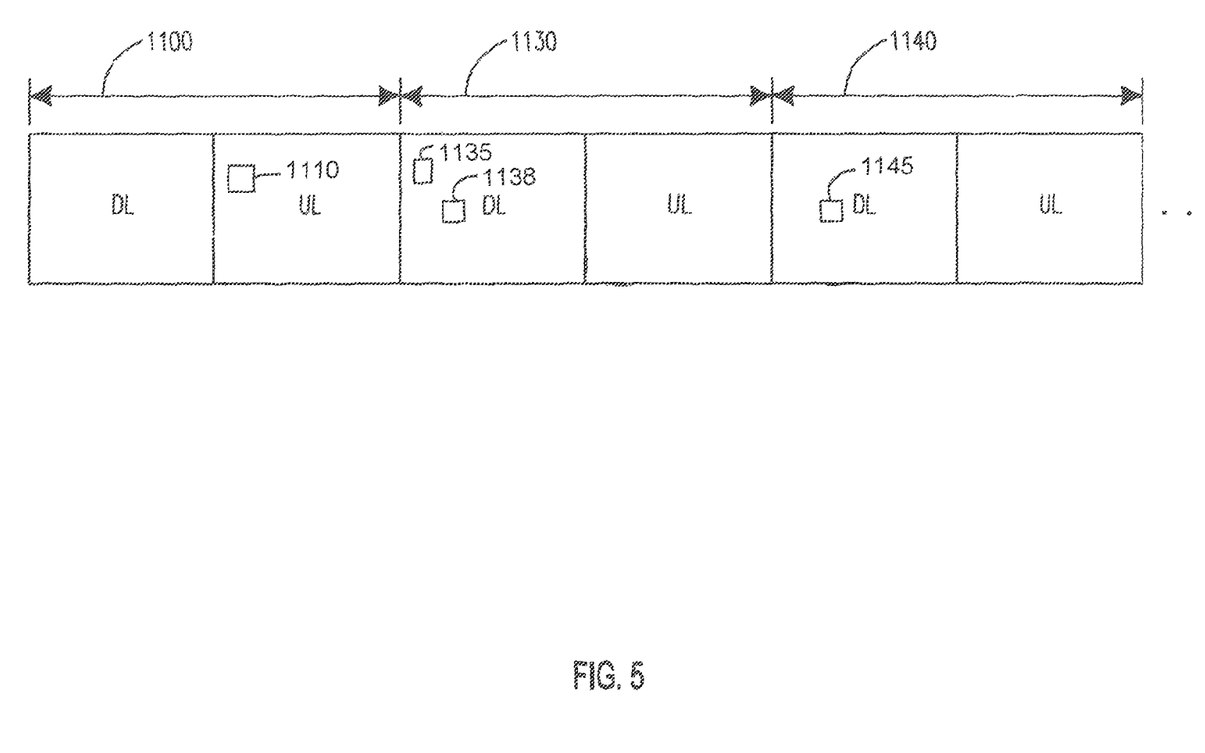
FIG. 5 shows an example of a BS's ranging RA response per RA region or per RA types when a RA region is shared by multiple RA types.

A similar embodiment may also be applied to the HO ranging RA process where the HO ranging RA opportunities may be in a separate RA region. Alternatively, as shown in FIG. 5 the HO ranging RA opportunities may share the same RA region 1110 as initial ranging opportunities, as shown in frame 1100. In other words, in FIG. 5, the shared RA region 1110 contains ranging RA opportunities for initial ranging and HO ranging. For example, in IEEE 802.16 systems, the initial ranging and HO ranging may share the same RA region where they are distinguished by using different RA codes.

When the HO ranging shares the same RA region with the initial ranging, the BS may send one RA response message 1135 containing the responses to all successfully received and decoded initial ranging RA requests and HO ranging RA requests at the earliest BS initial/HO ranging response opportunity (in frame 1130 for the HO ranging RA request). In FIG. 5, the BS ranging RA response message 1135 contains responses to all received RA requests, including initial ranging RA requests and HO ranging RA requests in the previous ranging RA region. Alternatively, the BS may send two separate aggregate RA response messages 1138, 1145, one for initial ranging and one for HO ranging, at the earliest BS HO ranging RA response opportunity and the earliest BS initial ranging RA ranging response opportunity in frames 1130 and 1140, respectively. In FIG. 5, the BS sends two separate RA response messages, one containing responses to all received initial ranging RA requests and the other containing responses to all received HO ranging RA requests, with the same or different response time. The earliest BS initial ranging RA response opportunity may be different from the earliest BS HO ranging RA response opportunity, depending on the BS scheduler's decision regarding the priorities of those RA responses and the BS's real-time traffic load and traffic composition.

4.1.3 Periodic Ranging Request

In addition, a similar embodiment may also be applied to a periodic ranging RA process. Similarly, the periodic ranging RA opportunities may be in a separate RA region. In this case, after each periodic ranging RA region, the BS sends a periodic ranging RA response message containing the RA responses to all successfully received and decoded periodic ranging RA requests at the earliest possible BS periodic ranging response time.

The periodic ranging RA region may have a different PHY channel design from the initial ranging/HO ranging RA region, as it may be for the random access from the WTRUs that have been synchronized with the BS in the UL.

Alternatively, the periodic ranging RA opportunities may share the same RA region with other ranging types, e.g., initial ranging and/or HO ranging. In this case, after each ranging RA region, the BS may send one single ranging RA response message containing the RA responses to all successfully received and decoded ranging RA requests including all ranging types at the earliest possible BS ranging RA response time. Alternatively, the BS may send multiple ranging RA response messages, one for each ranging type or any combination of the ranging types supported in the ranging RA region, at the same or different earliest RA response time.

4.1.4 Contention-Based Request

Figure 6:
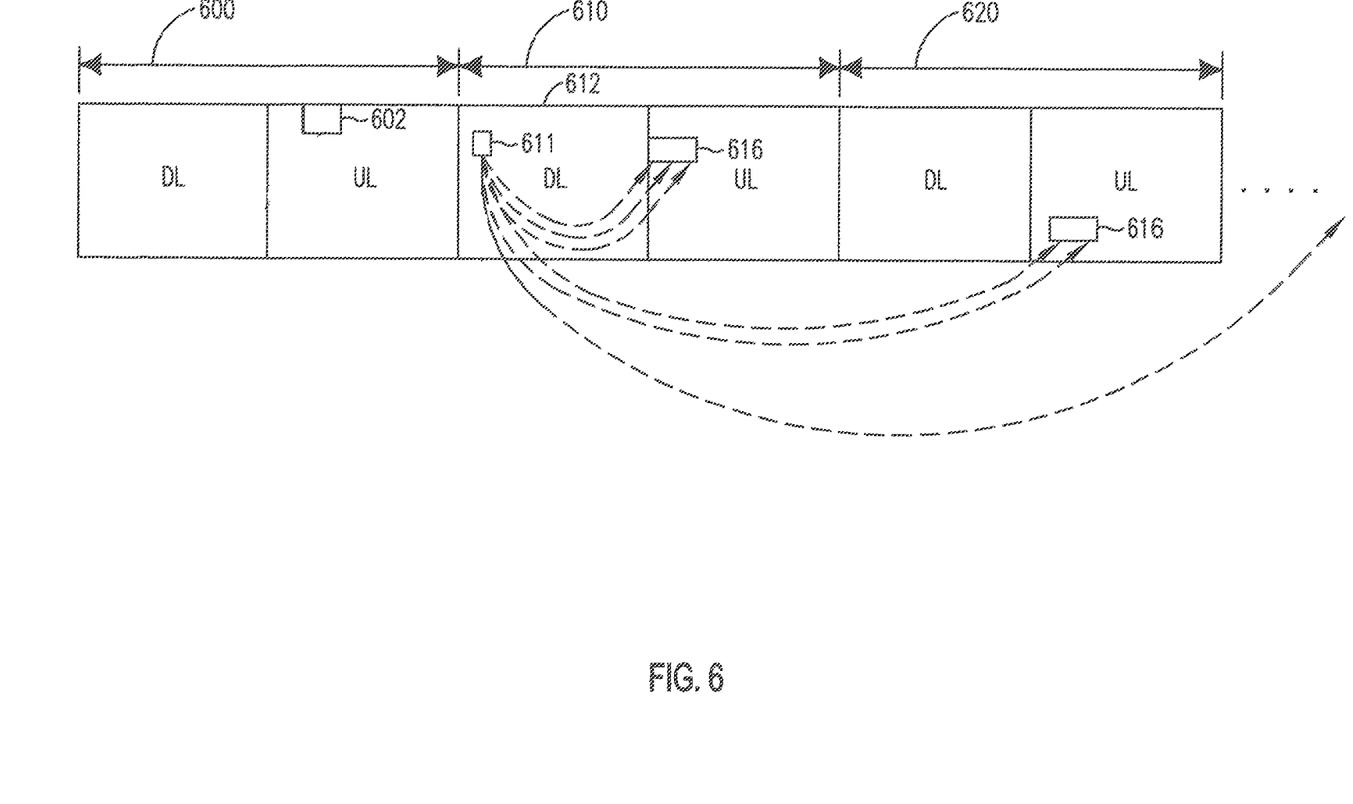
FIG. 6 is a diagram of an example of a single BS RA response message for contention-based bandwidth request.

In another embodiment, with the contention-based bandwidth Request RA, the BS RA response messages may contain the resource allocations that may be located in the next UL region or spread in the next multiple UL regions. As shown in a simplified frame shown in FIG. 6, for the RA region 602 in frame 600, the BS sends a BS RA aggregate response message 611 in the DL 612 of frame 610, which contains the responses to all the correctly received RA requests, where the responses may contain the resource allocations 616 in frame n 610 or the next several frames 620. In FIG. 6, the aggregate response message 611 is one single BS RA message containing responses to all received RA requests. Actual UL allocations may spread into next multiple UL regions.

The BS RA aggregate response message 611 may also indicate a future sub-frame where a UL resource allocation control signal, e.g., Advanced-MAP (A-MAP) in IEEE 802.16m, containing the actual allocation may be found.

In this way, the BS RA aggregate response message 611 also serves as the acknowledgement to the WTRUs for their bandwidth request RA requests sent in the previous bandwidth request RA region. That is, the BS RA aggregate response message may serve two functions: one to allocate resources; and the other to acknowledge WTRUs that used the previous RA region.

For a WTRU that used a RA opportunity for an UL bandwidth request in the previous bandwidth request RA region, if the WTRU receives the expected response from the BS RA aggregate response message, it may consider that its RA attempt was successful and also know where its UL unicast allocation is. If the WTRU does not receive its expected response in the BS RA aggregate response message, it may recognize that its RA attempt failed, and it may start the recovery process immediately or at such time as makes sense.

4.1.5 Additional Embodiments Regarding Responses

In another embodiment, after sending a RA request, if the WTRU does not receive a response in the aggregate RA response message from the BS, it may start the RA recovery procedure, unless a maximum number of allowed RA attempts have been reached.

Alternatively, in another embodiment, an explicit ACK may be sent immediately upon detection of the RA request. For a RA request that requires resource allocation, the actual resource grant may be sent at a later time when resources are available.

Upon receiving an ACK for a RA request requiring resource allocation, the WTRU may start a timer. Expiration of the timer without grant/response may be a cause for the WTRU to retry the access procedure. This may prevent the WTRU from waiting too long in the event of a reception error.

In another embodiment, in the BS RA aggregate response message, the successfully received and decoded RA requests are identified by the RA opportunity descriptors, e.g., the RA region, the RA channel, and the RA code (as used, for example in IEEE 802.16 systems), or identifiers derived from the RA opportunity descriptors. If the RA opportunity descriptors are used in the BS RA response message for a RA region, the coding efficiency may be improved by using a two-level list, i.e., listing the RA channels with at least one received and decoded RA code and then, for each listed RA channel, listing all received and decoded RA codes, as compared to using a one-level list of the pairs (RA channel, RA Code) for the received and decoded RA opportunities.

In another embodiment, the ACK may be sent per code and RA channel combination, together called a RA opportunity. RA opportunities may be partitioned into groups. For each group, all successfully received RAs are signaled. For each access group with N opportunities, up to Kmax received RAs may be signaled. The number K may be signaled, which requires $\log_2(Kmax)$ bits. An index to the combination of successful RA's may be signaled, which requires $\log_2(N/K)$ bits. An index may be reserved to signal the event where K>Kmax.

In another embodiment, the BS assists the WTRUs to have an improved time period for the RA timer that is dynamic and varies with the system loads. For example, for the RA resource allocation requests, when the system is lightly loaded, the required resources can be allocated quickly, therefore the RA timer value can be smaller. When the system is heavily loaded, then the required resources will be allocated spreading in the time domain, therefore the timer value should be larger. It is difficult or impossible for the WTRUs to dynamically change their RA timer because the WTRU does not have the system loading information without being informed by the BS. With BS assistance, after the BS receives/processes a RA region, it sends out a broadcast message, telling the WTRUs the RA timer values for the given RA region, based on the BS's knowledge about how long it will take to finish responding to those correctly received RA requests. Alternatively, sending time is unspecified, and the WTRU follows the last RA timer value available.

When multiple classes of RA requests are supported, if the RA class information is provided in the received RA requests, the BS may also send multiple RA time values, each for a specific RA request class. An RA timer setting broadcast message may be very short, as it only contains small numbers, i.e., the RA timer values. This embodiment may also apply to the detections of both collision-caused RA failure and power-too-low-caused RA failure. If the WTRU does not receive the expected RA response within the given time, it may start the RA recovery procedure unless the maximum number of allowed RA attempts has been reached.

4.2 Collisions

In a first method to address collisions, all wireless transmit/receive units (WTRUs) may use distinct codes; however, due to receiver limitations, more codes are used than can be detected. The first result may be that not all codes are detected, but those that are detected are correct. This is a problem only if all WTRUs choose the same channel again. The second result is that false detections are made. This would be a low probability event, and the recovery from it would be in a verification stage.

Figure 7:
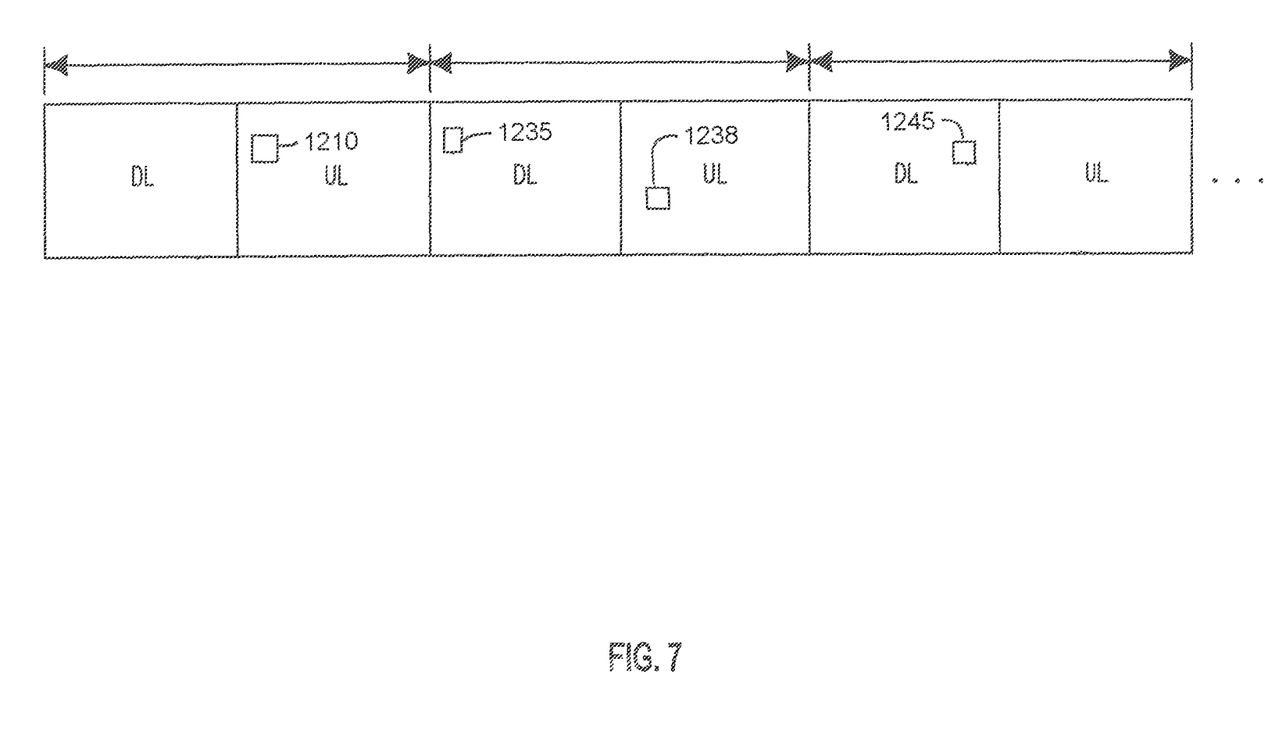
FIG. 7 shows an example of an uplink data collision after RA requests when HARQ is not used.

A first embodiment may address the UL data collision problem caused by missed-detection of RA collisions when UL Hybrid Automatic Repeat Request (HARQ) is not used. In FIG. 7, an RA region 1210 contains multiple RA request opportunities requiring UL resource allocation (e.g., contention-based bandwidth requests). A missed-detection of RA collision happens when the BS erroneously detects a single RA request in a RA opportunity that had a RA collision, i.e., accessed by two or more WTRUs. If the expected RA response 1235 may involve a unicast UL data allocation, for example, in the contention-based UL bandwidth request RA process, the BS may allocate a unicast UL allocation to the decoded RA request. However, two or more WTRUs that used the same RA opportunity may then transmit in the UL allocation 1238, thus resulting in data region collision.

When UL HARQ is not used for the UL transmission, the involved WTRUs may detect the UL data region collision by a failure of receiving the expected response from the BS to their UL data if their UL data requires certain response, for example, as part of hand-shaking protocol data; otherwise, the involved WTRUs may not be able to detect such an UL data region collision at the MAC layer. The proposed embodiment may use the BS's assistance to the WTRUs in detecting such UL data region collisions. The BS has the knowledge about which UL data allocation is for a RA response, and the BS also has the knowledge if the UL data region has been successfully received. Therefore, in case of UL data region collision, the BS can use its knowledge to send an indication to the WTRUs to inform them of the failure of reception of the UL data region allocated for a RA request. Such an indication of UL data region collisions may be called an RA-initiated UL data Negative-ACKnowledgement (NACK).

When the WTRUs that used the given UL allocation receive such a RA-initiated UL data NACK from the BS, they may realize that an error occurred in their "on-going" procedure, and an error recovery is needed.

In FIG. 7, the BS sends a NACK 1245 indicating a failure of reception of the UL burst allocated for the RA request. In a RA-initiated UL data NACK 1245 sent by the BS, the UL data region may be identified by the RA request to which the UL data allocation was given as the response, where the RA request may be identified by the RA request descriptors, for example, the RA region, the RA channel, and the RA code, or an identifier derived from these RA descriptors.

In a RA-initiated UL data NACK 1245 sent by the BS, the UL data region may also be identified by the UL data allocation descriptors, for example, frame index, subframe index, LRU (Logical Resource Unit) index, etc., or an identifier derived from these UL allocation descriptors.

The BS may send a RA-initiated UL data NACK 1245 as a MAC control signal. For example, in IEEE 802.16 systems, such a RA-initiated UL data NACK may be encoded as a control message, a control signaling header, or a subheader or extended header of a MAC PDU (Protocol Data Unit), or an Advanced-MAP (A-MAP) Information Element (IE).

Another embodiment may address the UL data collision problem caused by missed-detection of a RA collision when UL HARQ is used. In this case, the UL data collision caused by missed-detection of a RA collision may cause substantial resource waste, because it may force the collided WTRUs to repeatedly retransmit and hence re-collide until reaching the maximum allowed number of HARQ retransmissions. With UL HARQ, detecting an UL data region collision may require additional attempts and/or other techniques than just normal UL data HARQ decoding, because a single burst error may be difficult to tell if it is the result of normal link error or a collision.

Figure 8:
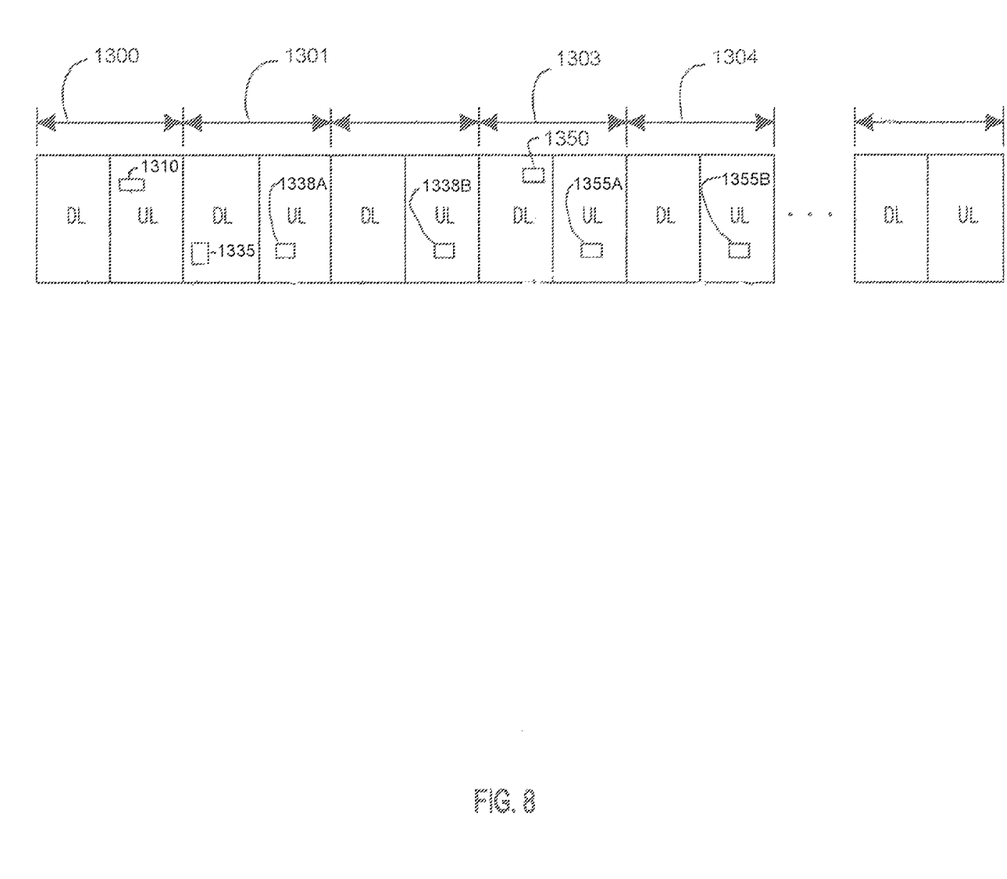
FIG. 8 shows an example of an UL data region collision after RA request when UL HARQ is used.

As shown in FIG. 8, multiple RA request opportunities are transmitted in a random access region 1310 of frame 1300 in the uplink, and, in the frame 1301, the BS aggregate RA response message 1335 provides responses to all received RA requests in the random access region 1310, some of which may provide UL resource allocations (e.g., contention-based bandwidth requests), and other requests. After receiving and decoding the first UL transmission in an UL data allocation as the response to a RA request in the random access region 1310, the BS may still be able to detect a collision. For example, the BS may consider that a collision is detected if the UL data region 1338A, 1338B experiences an abnormally high level of errors based on the channel coding, such as Incremental Redundancy HARQ (IR HARQ), or if it observes other abnormal physical signal changes, e.g., channel delay spread. In FIG. 8, a UL resource allocation in the UL data region 1338A, 1338B is made as a response to an RA request that was a missed-detection of a collision (i.e., erroneously detected as a successful RA request but was actually a collision (i.e., sent by more than one WTRU)). Consequently, more than one WTRU transmits in this UL allocation, thus resulting in a UL data region collision.

When receiving and decoding a subsequent UL HARQ retransmission but before reaching the maximum number of HARQ retransmissions, the BS may be able to detect a collision in an UL data allocation as the response to a RA request. For example, the BS may consider that a collision is detected if it observes no gain has been obtained from the UL HARQ retransmissions.

Once detected, an UL data region collision may be handled by using the BS's assistance to help the WTRUs to timely detect the error condition, stop UL HARQ retransmissions, and enter an error recovery process. The BS assistance may be an indication signal sent by the BS to the WTRUs, e.g., a RA-initiated UL data Negative ACKnowledgement (NACK) 1350 in the downlink in frame 1303 in FIG. 8. In FIG. 8, the NACK 1350 from the BS may be, for example, a control signal terminating the synchronized UL HARQ allocations, indicating a failure of reception of the UL burst allocated for the RA request. UL resources in regions 1355A and 1355B in frames 1303 and 1304, respectively, of FIG. 8, originally allocated for synchronized UL HARQ retransmissions, are now used for other UL traffic.

When receiving such a RA-initiated UL data NACK 1350 from the BS, the WTRU may stop the HARQ retransmission process and enter the random access recovery process immediately.

Similar to the previous embodiment, the RA-initiated UL data NACK 1350 signaled by the BS may be encoded as a MAC control signal, for example, in IEEE 802.16 systems, a control message, or a control signaling header, or a subheader or extended header of a MAC PDU (Protocol Data Unit), or an Advanced-MAP (A-MAP) Information Element (IE).

In addition, if the synchronized UL HARQ is used, the RA-initiated UL data NACK sent by the BS may be the same control signal used to terminate the synchronized UL resource allocations for UL HARQ retransmissions, for example in frame 1303 in FIG. 8. For example, in IEEE 802.16 systems, a CDMA allocation A-MAP IE with zero allocation can be used by the BS to signal the RA-initiated UL data NACK and also to terminate the synchronized UL resource allocations for UL HARQ retransmissions.

Also, if the non-synchronized UL HARQ is used, the RA-initiated UL data NACK signaled by the BS may be a combination of UL HARQ NACK and no UL resource allocated for the HARQ retransmission within a pre-defined time interval after the previous HARQ transmission or retransmission.

Alternatively, if the non-synchronized UL HARQ is used, the RA-initiated UL data NACK signaled by the BS may be a combination of UL HARQ NACK and zero UL resource allocation for the HARQ retransmission. For example, in IEEE 802.16 systems, zero UL resource allocation may be a CDMA allocation A-MAP IE with zero allocation.

When using the zero allocation for the UL HARQ retransmission for an UL allocation following a RA request to terminate its UL HARQ retransmission process, the intended WTRUs may be identified by the previously used RA opportunity descriptors, for example, the RA region, the RA channel, and the RA code, or an identifier derived from these RA descriptors.

Alternatively, when using the zero allocation for the UL HARQ retransmission for an UL allocation following a RA request to terminate its UL HARQ retransmission process, its intended WTRUs may be identified by the previously used UL data allocation descriptors, for example, frame index, subframe index, LRU (Logical Resource Unit) index, etc., or an identifier derived from these UL allocation descriptors.

When using the zero allocation for the UL HARQ retransmission for an UL allocation following a RA request to terminate its UL HARQ retransmission process, the identifiers of its intended WTRUs may be included in an information field in the zero allocation control signal or may be masked with the Cyclic Redundancy Check (CRC) of the zero allocation control signal.

The zero allocation control signal may be encoded as a stand-alone UL resource allocation information element, for example, a stand-alone A-MAP IE, where its type value indicates the zero UL allocation.

Alternatively, the zero allocation control signal may be encoded as a special case of the UL allocation IE for the UL allocation following a RA request, for example, the CDMA Allocation IE, where the special case may be indicated by a specific value of an information field in the UL allocation IE.

Another embodiment may address the UL data collision problem caused by missed-detection of RA collisions when UL HARQ is used. The BS may configure a limited number of UL HARQ retransmissions for the UL data region allocated as a response to a RA request, where such a limited number is less than a maximum number of UL HARQ retransmissions for other UL allocations. With this embodiment, the WTRU that transmits in an UL allocation following a RA request may exit the UL HARQ retransmission when it has transmitted the transmission n times including the original transmission, where $1 \leq n \leq Max\_num\_HARQ\_retransmissions$. The value of n may be decided by system configuration. The n-th HARQ NACK from the BS also indicates the termination of the HARQ retransmission process. When receiving the n-th HARQ NACK, the WTRU terminates the UL HARQ retransmission and may enter the random access recovery process.

Another embodiment may address the collision problem where not all codes are detected and where nothing is detected. This embodiment uses a recovery mechanism such that the WTRU may randomize its choice of slot and codes.

Another embodiment may address the RA collision problem where a RA collision is detected. In this example, the BS may send a NACK to notify the WTRUs that the RA failures that the BS detected in the previous RA region are due to collisions. The benefit of sending a NACK and not an ACK is in reduced overhead as NACK signals are the exception rather than the rule.

Figure 9:
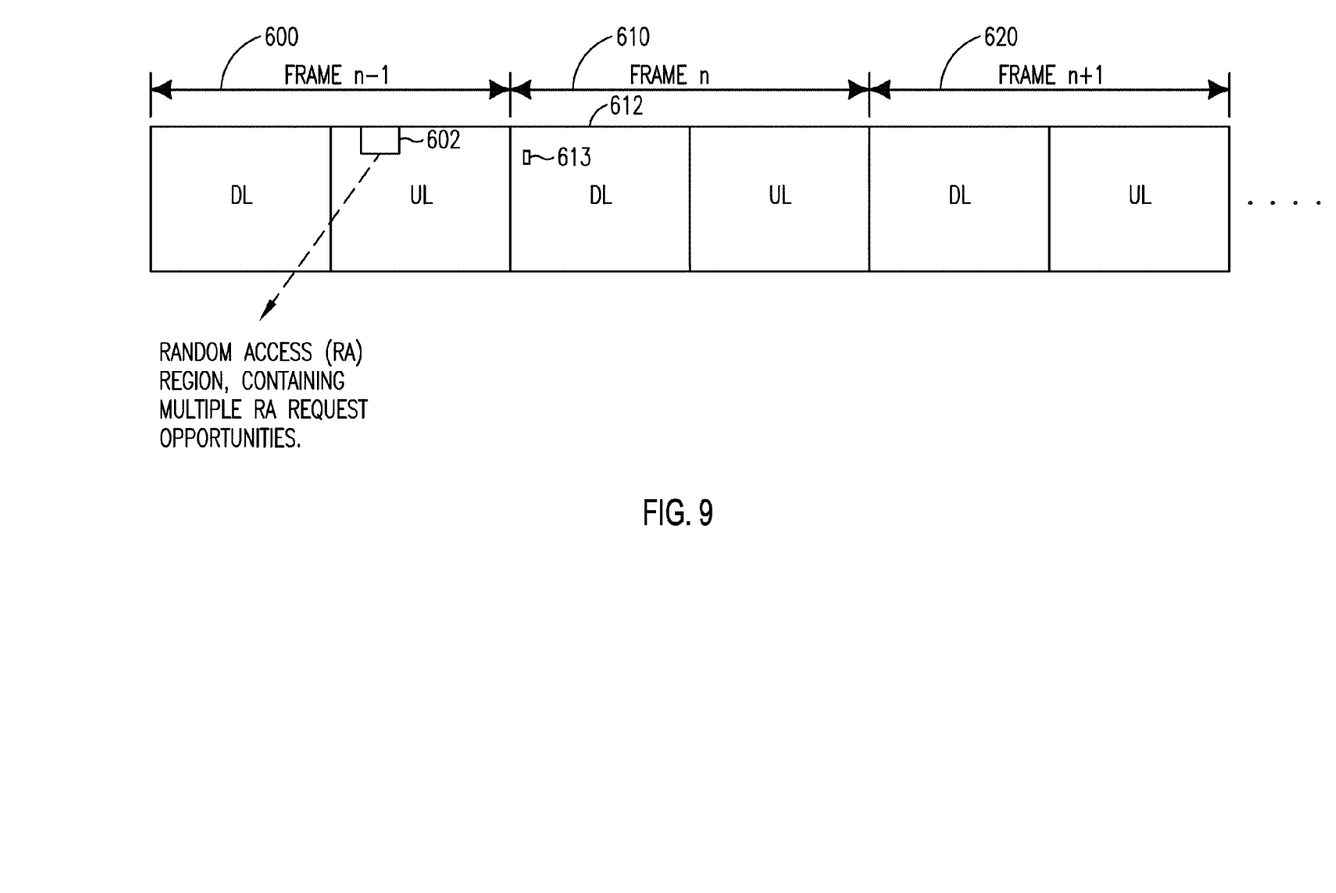
FIG. 9 is a diagram of an example using BS-Assistance information in a RA timer or a negative acknowledgement (NACK).

FIG. 9 is a diagram of a frame using BS-Assistance information in a RA timer or a NACK. When a BS detects a collision in RA, at the next DL opportunity, the BS may send a NACK message 613 to inform the subscribers of the detected collision. This will simultaneously eliminate/minimize the false detection at the WTRU side and reduce the RA latency significantly. The proposed NACK mechanism may be an addition to the WTRU timer-based mechanism, not a replacement. A timer-based mechanism may be employed to be the backup mechanism in certain scenarios.

The embodiments discussed herein may address the detections of both collision-caused RA failure and insufficient signal power RA failure, as well as other causes of RA failure.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
a processor; and
a transceiver,
the processor and the transceiver are configured to acquire a first random access configuration and a second random access configuration, wherein the first random access configuration and the second random access configuration are different, and
the processor and the transceiver are further configured to perform a first random access procedure using the first random access configuration using first physical resources and a second random access procedure using the second random access configuration using second physical resources, wherein the first random access configuration is used for at least initial random access and the second random access configuration is used for timing adjustments, wherein the first physical resources are different physical resources than the second physical resources, and
the processor and the transceiver are further configured to receive a first message for the first random access procedure and to receive a second message for the second random access procedure, wherein the first message includes a single medium access control (MAC) header and a plurality of first random access responses and the second message includes a single MAC header and a plurality of second random access responses.

2. The WTRU of claim 1, wherein the second random access configuration is used for periodic random access.

3. The WTRU of claim 1, wherein the processor is further configured for each of the first message and the second message to identify one of the random access responses as being for the WTRU using a code indicated in the identified random access response.

4. The WTRU of claim 1, wherein the first random access procedure is further used for handover random access.

5. The WTRU of claim 1, wherein the second random access configuration is further used for power adjustments.

6. The WTRU of claim 1, wherein the first random access configuration includes at least one random access code for use in the first random access procedure and the second random access configuration includes at least one random access code for use in the second random access procedure.

7. The WTRU of claim 1, wherein the second random access procedure is for WTRUs that have been synchronized with a base station in the uplink.

8. The WTRU of claim 7, wherein the first random access procedure is for WTRUs that have been synchronized with the base station in the downlink.

9. A method comprising:
acquiring, by a wireless transmit/receive unit (WTRU), a first random access configuration and a second random access configuration, wherein the first random access configuration and the second random access configuration are different; and
performing, by the WTRU, a first random access procedure using the first random access configuration using first physical resources and a second random access procedure using the second random access configuration using second physical resources, wherein the first random access configuration is used for at least initial random access and the second random access configuration is used for timing adjustments, wherein the first physical resources are different physical resources than the second physical resources, and
receiving a first message for the first random access procedure and receiving a second message for the second random access procedure, wherein the first message includes a single medium access control (MAC) header and a plurality of first random access responses and the second message includes a single MAC header and a plurality of second random access responses.

10. The method of claim 9, wherein the second random access configuration is used for periodic random access.

11. The method of claim 9, further comprising identifying, for each of the first message and the second message, one of the random access responses as being for the WTRU using a code indicated in the identified random access response.

12. The method of claim 9, wherein the first random access procedure is further used for handover random access.

13. The method of claim 9, wherein the second random access configuration is further used for power adjustments.

14. The method of claim 9, wherein the first random access configuration includes at least one random access code for use in the first random access procedure and the second random access configuration includes at least one random access code for use in the second random access procedure.

15. The method of claim 9, wherein the second random access procedure is for WTRUs that have been synchronized with a base station in the uplink.

16. The method of claim 15, wherein the first random access procedure is for WTRUs that have been synchronized with the base station in the downlink.

\* \* \* \* \*